(12) United States Patent
Kotlar et al.

(10) Patent No.: US 7,270,184 B2
(45) Date of Patent: Sep. 18, 2007

(54) METHOD OF WELL TREATMENT

(75) Inventors: Hans Kristian Kotlar, Stavanger (NO); Birgitte Schilling, Stavanger (NO); Johan Sjöblom, Stavanger (NO)

(73) Assignee: Statoil ASA, Stavanger (NO)

( * ) Notice: Subject to any disclaimer, the term of this patent is extended or adjusted under 35 U.S.C. 154(b) by 250 days.

(21) Appl. No.: 10/472,181

(22) PCT Filed: Mar. 27, 2002

(86) PCT No.: PCT/EP02/03509

§ 371 (c)(1),
(2), (4) Date: Dec. 23, 2004

(87) PCT Pub. No.: WO02/079608

PCT Pub. Date: Oct. 10, 2002

(65) Prior Publication Data

US 2005/0115710 A1 Jun. 2, 2005

(30) Foreign Application Priority Data

Mar. 30, 2001 (GB) ................................. 0108086.0

(51) Int. Cl.
*E21B 33/138* (2006.01)
*E21B 43/267* (2006.01)

(52) U.S. Cl. .................. 166/295; 166/279; 166/280.1; 166/300; 507/203; 507/221; 507/224; 507/231; 507/263; 507/267; 523/130

(58) Field of Classification Search ................ 166/278, 166/279, 280.2, 294, 295, 300; 507/203, 507/221, 224, 231, 263, 267; 523/130
See application file for complete search history.

(56) References Cited

U.S. PATENT DOCUMENTS

| 4,542,791 | A |   | 9/1985 | Drake et al. |   |
|---|---|---|---|---|---|
| 4,891,072 | A |   | 1/1990 | Cooper |   |
| 4,933,404 | A | * | 6/1990 | Beckman et al. | 526/207 |
| 5,048,607 | A |   | 9/1991 | Phelps et al. |   |
| 5,053,448 | A | * | 10/1991 | Tsaur | 524/460 |
| 5,292,800 | A |   | 3/1994 | Moench et al. |   |
| 5,977,194 | A | * | 11/1999 | Mork et al. | 521/61 |
| 6,147,131 | A | * | 11/2000 | Mork et al. | 521/61 |
| 6,169,058 | B1 | * | 1/2001 | Le et al. | 507/222 |

FOREIGN PATENT DOCUMENTS

EP    0 651 131 B1    6/1999

* cited by examiner

*Primary Examiner*—George Suchfield
(74) *Attorney, Agent, or Firm*—Bacon & Thomas, PLLC

(57) ABSTRACT

The invention provides a method of well treatment comprising introducing into the matrix surrounding a hydrocarbon well bore hole an emulsion the discontinuous phase of which comprises a non-polymerizable, water or oil miscible liquid carrier, a polymerizable monomer and a thermally activated polymerization initiator, said monomer constituting from 2 to 40% wt. of said discontinuous phase.

13 Claims, No Drawings

METHOD OF WELL TREATMENT

The present invention relates to a method of well treatment of a hydrocarbon well (e.g. to reduce or divert undesired water flow within the matrix surrounding the well bore) and also to a composition for use in such a well treatment method.

During the operation of a hydrocarbon well (i.e. a gas or oil well) various down-hole problem arise such as corrosion of metal fittings, hydrocarbon flow-inhibiting deposition (e.g. of scale, gas clathrates, metal sulphides, waxes, gel polymers, microbial debris, etc.), generation of toxic hydrogen sulphide by sulphate-reducing bacteria, increased water flow into the producer bore, etc.

Thus, for example, where sea water is injected through an injection bore hole into an oil-bearing stratum to drive oil through the formation (i.e. the rock) into the producer well hole, differences in solutes in the injection water and the water already present in the formation can cause metal salts to precipitate as scale so causing gradually increasing clogging of the producer well hole.

Typically this is dealt with by applying a "squeeze" of scale inhibitor chemicals, i.e. chemicals which break down the scale and increase oil or gas flow. This generally involves ceasing hydrocarbon flow, forcing an aqueous solution of the scale inhibitor down the producer bore under pressure to drive the inhibitor solution into the formation, and restarting production. Such treatment generally allows a further six or so months of hydrocarbon flow before a further squeeze is required and each squeeze causes some damage to the formation surrounding the producer bore hole and as a result an increased flow of formation fragments (i.e. rock grains etc.) into the bore.

The producer bore hole in an oil well is generally lined in the hydrocarbon bearing stratum with "gravel packs", sand containing filter elements, which serve to trap formation fragments and it has been proposed to include in such gravel packs ceramic particles coated with or impregnated with well treatment chemicals such as scale inhibitors (see EP-A-656459 and WO 96/27070) or bacteria (see WO 99/36667). Likewise treatment of the formation surrounding the producer well bore hole with well treatment chemicals before hydrocarbon production begins has also been proposed, e.g. in GB-A-2290096 and WO 99/54592.

Various polymeric, oligomeric, inorganic and other particulate carriers for well treatment chemicals are also known, e.g. ion exchange resin particles (see U.S. Pat. No. 4,787,455), acrylamide polymer particles (see EP-A-193369), gelatin capsules (see U.S. Pat. No. 3,676,363), oligomeric matrices and capsules (see U.S. Pat. No. 4,906,353 and U.S. Pat. No. 4,986,354), ceramic particles (see WO 99/54592, WO 96/27070 and EP-A-656459), and particles of the well treatment chemical itself (see WO 97/45625).

There is a particular problem in that water in the hydrocarbon bearing strata can, enter the producer bore and be recovered together with the desired hydrocarbon. Such "produced water" then has to be separated out from the hydrocarbon product, cleaned and returned to the environment. As mentioned above, such water moreover can cause deposits within and corrosion of down-hole equipment causing the flow of hydrocarbon from the well to reduce and occasioning the need for periodic closure and squeeze treatment of the producer bore. These effects naturally have serious implications for the economy and efficiency of operation of hydrocarbon wells, especially offshore wells.

Methods of well treatment to reduce formation permeability in areas of a subterranean formation where water flow is causing problems are known. Thus for example U.S. Pat. No. 5,048,607 describes injection of an oil-in-water emulsion in which the oil phase droplets consist of styrene, divinylbenzene and a free radical polymerization initiator. Such an emulsion produces polystyrene particles by in situ polymerization. EP-A-651131 describes the use of an aqueous solution of a water-soluble acrylic monomer, a crosslinker and a polymerization initiator. Such a solution produces a gel by in-situ polymerization.

The present invention is likewise concerned with administration into the formation surrounding a well bore of an emulsion which is polymerizable to produce polymer particles within the formation. However it has been realized that it is beneficial for the discontinuous phase of the emulsion to contain a non-polymerizable liquid carrier, e.g. such that it contains only a minor proportion of polymerizable monomer; in this way, when the discontinuous phase of the emulsion is miscible with the ambient fluid in the matrix undesirable particle formation is minimized since the emulsion droplets will become diluted. Moreover the particles produced by the polymerization in the discontinuous phase of the emulsion may serve as reservoirs for well treatment chemicals, e.g. scale inhibitors.

Thus viewed from one aspect the invention provides a method of well treatment comprising introducing into the matrix surrounding a hydrocarbon well bore hole an emulsion the discontinuous phase of which comprises a non-polymerizable, water or oil miscible liquid carrier, a polymerizable monomer and a thermally activated polymerization initiator, said monomer constituting from 2 to 40% wt. of said discontinuous phase.

Viewed from a further aspect the invention provides a well treatment emulsion the discontinuous phase of which comprises a non-polymerizable, water or oil miscible liquid carrier, a polymerizable monomer and a thermally activated polymerization initiator, said monomer constituting from 2 to 40% wt. of said discontinuous phase.

Viewed from a still further aspect the invention also provided the use of an emulsion the discontinuous phase whereof comprises a polymerizable monomer, a thermally-activated polymerization initiator, and a non-polymerizable liquid carrier as a hydrocarbon well treatment agent.

The emulsions of or used according to the invention may be either oil-in-water or water-in-oil emulsions, i.e. the continuous phase may be either water- or oil-miscible and the discontinuous phase may be respectively either oil- or water-miscible. In general, oil-in-water emulsions will generally be preferred. However water-in-oil emulsions may for example be used if for some reason it is decided to reduce hydrocarbon flow rate in a hydrocarbon bearing stratum or if it in desired to place reservoirs of water-soluble well treatment chemicals in a zone of a hydrocarbon bearing stratum in advance of arrival of significant quantities of water in that zone.

The terms oil-in-water emulsion and water-in-oil emulsion are used herein to relate to emulsions having a continuous liquid phase and a discontinuous liquid phase, one of which is water-miscible and the other of which is not. Thus while the water-miscible phase will generally be aqueous, it need not be and may for example comprise a solvent or solvent mixture, such as an alcohol which is water-miscible, in place of water.

The emulsions of or used according to the invention will generally contain at least one stabilizer, for example a surfactant (e.g. an amphiphile) or a macromolecule, for example a polysaccharide or polysaccharide derivative, such as a cellulosic ether, e.g. hydroxypropylmethylcellulose. If desired, the emulsions may also contain gums and/or gelling agents as stabilizers. The stabilizer will preferably be used as a minor component of the emulsion, e.g. in quantities sufficient to stabilized the emulsion for the period between production and down hole placement. In general the stabilizer will constitute up to 20% wt. of the continuous phase, e.g. 0.5 to 10% wt., preferably 1 to 5% wt., especially 1.5 to 3% wt. Examples of suitable stabilizer surfactants include the SPAN and TWEEN surfactants. TWEEN is a non-ionic ethoxylated sorbitan ester. The esters may have different chain lengths as indicated by a number. e.g. TWEEN 20, TWEEN 80, etc. SPAN is an ester synthesised from fatty acid and sorbitol. As with TWEEN the esters may have different chain lengths as indicated by a number e.g. SPAN 80. Non ionic surfactants such as BEROL 06 (available from Akzo Nobel and referred to herein as 10EO since the stabilizer contains 10 ethoxy groups per molecule), HTAB (hexadecyltrimethylammonium bromide), BEROL 26 (available from Akzo Nobel) and, especially, SPAN 80 are particularly preferred. BEROL 06 is based on ethoxylates of oleyl alcohols. The designated number in this case indicates the number of ethoxy groups present.

The term monomer is used herein to refer to the molecular building blocks from which a polymer may be produced. The term thus includes the primary monomer, as well as any branching or non-branching comonomers, or crosslinking agents. In general however non-branching/non-crosslinking monomers will constitute at least 80% wt., preferably at least 90% wt., more preferably at least 95% wt. of the overall monomer.

For the oil-in-water emulsions, the monomer is preferably selected from acrylic, vinylic and styrenic monomers, and co-monomers, cross-linking agents, branching monomers, etc., polymerizable therewith. Examples of appropriate monomers include vinyl aliphatic monomers such as esters of acrylic and methacrylic acids, acrylonitrile, and vinyl aromatic monomers such as styrene and substituted styrenes. Preferred are styrenic monomers, optionally and preferably together with cross-linkers, e.g. with divinyl benzene, and methyl methacrylate optionally and preferably together with cross-linkers such as EGMA (ethyleneglycoldimethacrylate). If desired, one or more of the monomers may be functionalised, e.g. to provide surface acidic or basic groups (e.g. carboxyl or amino functions) on the resulting polymer particles, for example to scavenge metal atom from water reaching the particles so as to reduce scale formation, to promote particle adhesion to formation surfaces, to promote or hinder particle aggregation, etc. Suitable vinylic monomers include compounds of formula $CH_2=CR_2$ were each R independently represents an aliphatic, cyclic hydrocarbyl, or functional group (e.g. containing up to 10 carbons).

For the water-in-oil emulsions, the monomers are preferably acidic vinylic, styrenic or acrylic monomers, e.g. acrylic acid, methacrylic acid, etc. Again a cross-linking agent is preferably included, e.g. Bis(N,N'-methylenebisacrylamide).

The monomer preferably comprises 2 to 30% wt. of the discontinuous phase, more preferably 3 to 20% wt., especially 5 to 15% wt.

Cross-linking monomers, e.g. divinylbenzene and Bis, are preferably used in a weight ratio to the non-crosslinking monomers of up to 1:1, especially 1:100 to 1:2, more especially 1:10 to 1:3.

The discontinuous phase of the emulsion also contains a polymerization initiator, preferably a thermally activated initiator, more preferably one activated at temperatures above 70° C. This initiator will generally be present as from 0.01 to 2% wt. of the discontinuous phase, more preferably 0.02 to 0.2% wt.

Examples of oil soluble initiators include AIBN(2,2'-azobis(2-methylpropionitrile)), and diazo and organic peroxide or peroxyester compounds, especially such compounds containing lipophilic carbon chains, and examples of water-soluble initiators include $NH_4S_2O_8$, $K_4S_2O_8$, water-soluble diazo salts and other ionic salts.

It is especially preferred that the discontinuous phase in an oil-in-water emulsion contain: 2 to 30% wt. of a non-cross-linking oil-soluble monomer, more preferably 5 to 8% wt.; 0.5 to 20% wt. of a cross-linking oil-soluble monomer, more preferably 1 to 2% wt.; and 0.04 to 0.15% wt. of a polymerization initiator.

The discontinuous phase of the emulsion may also, if desired, contain well treatment chemicals or precursors therefor. These may be any agents capable of tackling down hole problems, such as corrosion, hydrocarbon flow reduction, or $H_2S$ generation. Examples of such agents include scale inhibitors, foamers, corrosion inhibitors, biocides, surfactants, oxygen scavengers, bacteria etc. Thus for example typical scale inhibitors include inorganic and organic phosphonates (e.g. sodium aminotrismethylepephosphonate), polyaminocarboxylic acids, polyacrylamines, polycarboxylic acids, polysulfonic acids, phosphate esters, inorganic phosphates, polyacrylic acids, inulins (e.g. sodium carboxmethyl inulin), phytic acid and derivatives (especially carboxylic derivatives) thereof, polyaspartates, etc. Examples of preferred well treatment chemicals include: hydrate inhibitors, scale inhibitors, asphaltene inhibitors, wax inhibitors and corrosion inhibitors. Such inhibitors are well known to those working in the field of well treatment. Such chemicals may typically constitute up to 20% wt. of the discontinuous phase, e.g. 2 to 10% wt.

The discontinuous phase of the emulsion also contains a non-polymerizable liquid, e.g. a diluent, carrier or solvent. For oil-in-water emulsions this will typically be a hydrocarbon, e.g. a $C_4$ to $C_{60}$ hydrocarbon, or a mixture of such hydrocarbons, for example an alkane, a mineral oil, a plant oil or a animal oil. One preferred example is lamp oil. For water-in-oil emulsions, the non-polymerizable liquid will typically be water.

This non-polymerizable liquid may constitute up to about 98% wt. of the discontinuous phase, e.g. 60 to 90% wt.

Thus for example an oil-in-water emulsion might have a discontinuous phase containing 85 to 98% wt. of a saturated liquid hydrocarbon.

By liquid here is meant liquid at the pressures and temperatures encountered down-hole. However the liquids are preferably also in the liquid state at atmospheric pressure and 21° C.

The emulsions of the invention desirably have a droplet size for the discontinuous phase (D(v, 0.5)) of from 1 to 50 µm, preferably 4 to 25 µm. This can be achieved using standard emulsification techniques, e.g. using rotor-stator mixers. In the preparation of the emulsion, however, care may need to be taken to ensure that the discontinuous phase does not experience temperatures above the initiation temperature of the initiator or that it does not exceed such temperatures for long.

The emulsions of the invention are preferably relatively dilute, e.g. to achieve greater stability and retain a greater uniformity of droplet size. Accordingly the discontinuous phase preferably constitutes from 2 to 40% volume, more preferably 5 to 20% by volume, of the emulsions of invention.

In the method of the invention the emulsion may be placed down hole before and/or after hydrocarbon production (i.e. extraction of oil or gas from the well) has begun. Preferably the emulsion is placed down hole before production has begun, especially in the completion phase of well construction.

The emulsion may be placed within the bore hole (e.g. in the hydrocarbon bearing strata or in rat holes) or more preferably within the surrounding formation (e.g. in fissures or within the rock itself). In the former case, the emulsion may conveniently be impregnated into a tubular filter, e.g. a gravel pack or a filter structure as disclosed in EP-A-656459 or WO 96/27070; in the latter case, the emulsion is preferably positioned by squeezing it down the bore hole.

Where the emulsion is place within the surrounding formation, the pressure used should be sufficient to cause the dispersed phase droplets to penetrate at least 1 m, more preferably at least 1.5 m, still more preferably at least 2 m, into the formation. If desired, the emulsion may be applied in conjunction with proppant particles (e.g. as described in WO 99/54592) to achieve a penetration of up to about 100 m into the formation. Emulsions according to the invention further containing proppant particles form a further aspect of the invention.

While the method of the present invention is particularly suited to treatment of producer well holes (i.e. those from which the hydrocarbon is extracted), it can also be used on other well holes. Thus for example it can be used for water shut off of zones or for treatment of injector well holes.

All documents referred to herein are hereby incorporated by reference.

The invention will now be described further with reference to the following non-limiting Examples.

EXAMPLE 1

Oil-In-Water Emulsion
Aqueous phase: $10^{-3}$M aqueous NaCl solution with added thereto 2% wt. of a nonionic surfactant.
Oil phase: 6.5% wt. styrene
1.5% wt. divinylbenzene
0.065% wt. of AIBN
ad 100% wt kerosene (Statoil Lamp paraffin)

The oil and aqueous phases were mixed in volume ratios of 1:4 and 1:19 at 20000 rpm using a Bühler homogenizer. Emulsions were prepared using 10EO and HTAB as the surfactant. The 1:4 emulsions were stable for days at 70° C.; however 10EO gave longer stability.

EXAMPLE 2

Oil-In-Water Emulsion
Aqueous phase: $10^{-3}$M aqueous NaCl solution with added thereto 2% wt. of a nonionic surfactant.
Oil phase: 6.5% wt. methyl methacrylate
1.5% wt. EGMA (ethylene glycol dimethacrylate)
0.065% wt. of AIBN
ad 100% wt. kerosene (Statoil Lamp paraffin)

The oil and aqueous phases were mixed in volume ratios of 1:4 and 1:19 at 20000 rpm using a Bühler homogenizer. Emulsions were prepared using 10EO and HTAB as the surfactant. The 1:4 emulsions were stable for days at 70° C. Both surfactants gave comparable stability.

EXAMPLE 3

Test Polymerizations
The compositions of Examples 1 and 2, and equivalent compositions not containing the AIBN initiator, were heated to 70° C. for 5 hours and then left overnight. Particle sizes for the resulting polymer particles were then determined using a Malvern Mastersizer. The particles sizes determined are set out in Table 1 below.

TABLE 1

| Example | O/W Ratio | Surfactant | D(v, 0.1) μm | D(v, 0.5) μm | D(v, 0.9) μm |
|---|---|---|---|---|---|
| 1 | 1:4 | 10E0 | 0.57 | 1.63 | 5.67 |
| 1 | 1:4 | HTAB | 0.96 | 2.08 | 3.85 |
| 1 | 1:19 | 10E0 | 1.19 | 2.37 | 5.35 |
| 2 | 1;4 | 10E0 | 1.79 | 6.34 | 28.77 |
| 2 | 1:4 | HTAB | 1.19 | 2.15 | 3.72 |
| 2 | 1:19 | 10E0 | 1.23 | 2.81 | 32.96 |

EXAMPLE 4

Water-In-Oil Emulsion
Oil phase: Kerosene (Statoil Lamp paraffin) plus 2% wt. surfactant
Aqueous phase: 6% wt. acrylic acid
1.5% wt. BiS
0.06% wt. $NH_4S_2O_8$
ad 100% wt. water The oil and aqueous phases were mixed in volume ratios of 9:1 and 4:1 at 10000 or 20000 rpm in a Bühler homogenizer. In one case Bis was omitted. Emulsions were prepared using Span 80. Triton N-42 and Berol 26 as surfactants. The emulsions were stable for days at 70° C. Span 80 gave the best results.

EXAMPLE 5

Test Polymerizations
The Span 80-containing emulsions of Example 4 were polymerized by heating to 80° C. for three hours and leaving overnight at 60° C. Particle sizes were measured as in Example 3 and the results are set out in Table 2 below.

TABLE 2

| O/W Ratio | Shear (rpm) | D(v, 0.1) μm | D(v, 0.5) μm | D(v, 0.9) μm |
|---|---|---|---|---|
| 9:1* | 10000 | 1.55 | 4.61 | 15.43 |
| 9:1 | 10000 | 1.96 | 12.49 | 21.85 |
| 9:1 | 20000 | 1.39 | 2.53 | 4.34 |
| 4:1 | 10000 | 1.27 | 4.49 | 10.59 |
| 4:1 | 20000 | 1.23 | 2.31 | 3.99 |

*Bio omitted

As can be seen, the higher shear rates gave rise to smaller particles.

EXAMPLE 6

Core Blocking
In order to demonstrate the ability of the oil-in-water emulsions of the invention to decrease the porosity of the formation (i.e. the surrounding rock), two different core flooding experiments were carried out. In one, a Bentheimer core was oil-saturated and then at a core temperature of 80° C. a water-in-oil emulsion was introduced under pressure; in the second, a Bentheimer core was water-saturated and then at a core temperature of 80° C. an oil-in-water emulsion was introduced under pressure. In the first, polymerization of the discontinuous phase would reduce oil permeability, in the second water-permeability. The cores had an initial Kabs of 2.6 D indicating a pore throat opening of 25 to 35 µm. Oil permeability was reduced by 15% and water permeability by 34%.

The invention claimed is:

1. A method of well treatment comprising introducing into the matrix surrounding a hydrocarbon well bore hole an emulsion the discontinuous phase of which comprises a non-polymerizable, water or oil miscible liquid carrier, a polymerizable monomer and a thermally activated polymerization initiator, said monomer constituting from 2 to 40% wt. of said discontinuous phase.

2. A method as claimed in claim 1 wherein said discontinuous phase contains both non-crosslinking and crosslinking monomers.

3. A method as claimed in claim 1 wherein said discontinuous phase is oil-miscible and wherein the continuous phase of said emulsion is aqueous.

4. A method as claimed in claim 1 wherein said emulsion further contains a stabilizer.

5. A method as claimed in claim 1 wherein said discontinuous phase contains 2 to 30% wt. of a non-crosslinking oil-soluble polymerizable monomer, 0.5 to 20% wt. of a crosslinking oil soluble polymerizable monomer, and 0.04 to 0.15% wt. of a polymerization initiator said monomers constituting from 2 to 40% wt. of said discontinuous phase.

6. A method as claimed in claim 1 wherein said monomer is a styrenic monomer.

7. A method as claimed in claim 1 wherein said monomer is an acrylic or vinyl monomer.

8. A method as claimed in claim 1 wherein the droplets of the discontinuous phase in said emulsion have a droplet size of from 1 to 50 µm.

9. A method as claimed in claim 1 wherein said bore hole is a producer hole.

10. A well treatment chemical emulsion the discontinuous phase of which comprises 85 to 98% wt. of a saturated liquid hydrocarbon as a non-polymerizable, oil miscible liquid carrier, a polymerizable monomer and a thermally activated polymerization initiator, said monomer constituting from 2 to 40% wt. of said discontinuous phase.

11. An emulsion as claimed in claim 10 further containing a stabilizer.

12. An emulsion as claimed in claim 10 whereof said discontinuous phase constitutes 2 to 40% by volume.

13. A well treatment chemical emulsion as claimed in claim 10 as a hydrocarbon well treatment agent.

* * * * *